May 2, 1961  J. B. ORR  2,981,984

PLASTIC COATINGS FOR CONTAINERS

Filed June 18, 1959

INVENTOR.
John B. Orr

BY Green, McCallister & Miller

HIS ATTORNEYS

United States Patent Office 2,981,984
Patented May 2, 1961

2,981,984

PLASTIC COATINGS FOR CONTAINERS

John B. Orr, R.F.D. 3, Great Barrington, Mass.

Filed June 18, 1959, Ser. No. 821,169

1 Claim. (Cl. 18—59)

This invention relates to a plastic coated container and more particularly, to a non-plastic container enclosed by resin or plastic material and to procedure for molding expandable resin or plastic material around on a pre-formed container.

Although glass and metal containers which are commonly used for packaging many products possess high strength and good corrosive resistance properties, they both have undesirable features which tend to limit their usage and consumer appeal. Usually metal containers are made in conventional, cylindrical or rectangular shapes, with uniform, straight-side walls which are not particularly pleasing to the eye, and therefore, have a low sales appeal to the consuming public. Glass containers, on the other hand, although often made in pleasing shapes, are brittle and easily broken, and therefore, are unsuitable for packaging many materials and particularly materials under pressure.

Figure 1:
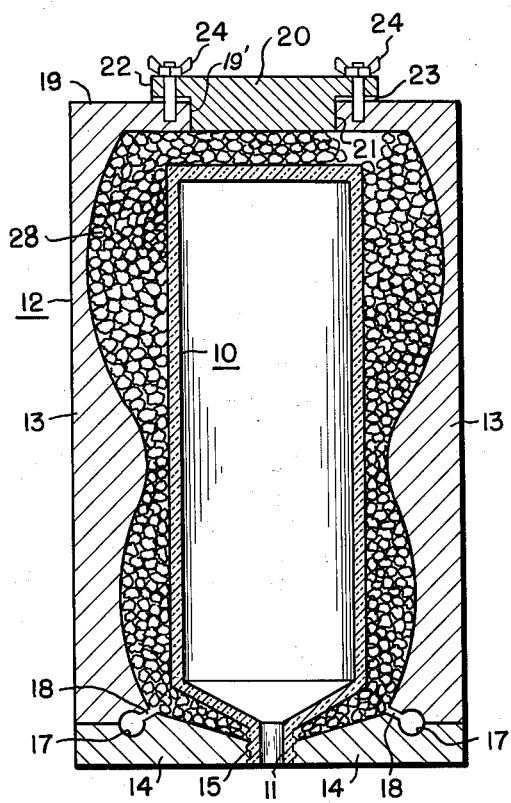
Figure 2:
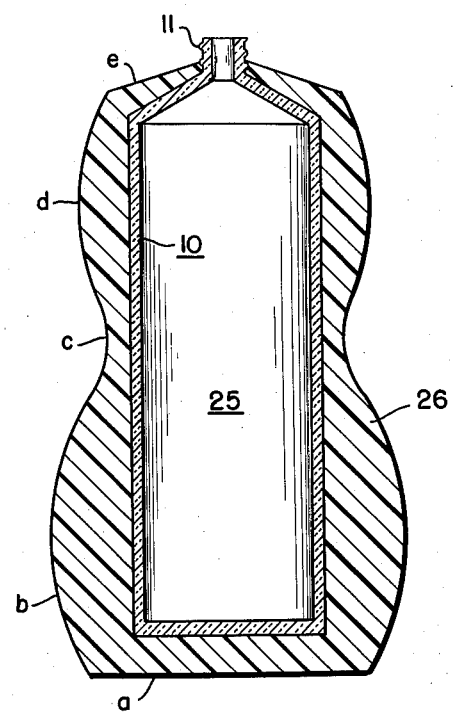

It thus has been an object of my invention to utilize the good properties including corrosive resistance, of relatively rigid wall containers, such as those of glass and metal, and provide them with an outer resin or plastic wall or coating to improve their usefulness as well as provide them with a better consumer appeal;

A further object of my invention has been to provide a composite container that combines the utilitarian properties of glass and metal containers with the good properties of a resin container and in such a manner as to make possible an improved type;

A further object of my invention has been to devise procedure for forming an outer wall or shell part of plastic material about a relatively rigid inner container part;

These and other objects of my invention will be apparent to those skilled in the art from the following disclosure and accompanying drawings in which:

Figure 1 is a cross-sectional view in elevation of a previously-formed container part employed as a part of a mold assembly that has expandable resin pellets within its cavity and about the container part; and, Figure 2 is a side elevation in section showing a composite container made in accordance with my invention.

In carrying out my invention, I have discovered that I can provide a practical composite form of container which has as its base, primary or inner part, a previously formed solid or relatively rigid shape of a suitable material, such as glass or metal, and which shape may be of a more or less plain type without configuration. I have also been able to provide an enclosing wall or shell of a plastic or resinous material which is formed about the primary part, becomes an integral and adherent part thereof, and which may be provided with any desired utilitarian and ornamental shape.

The composite article thus provided employs a primary part having a pre-formed wall cavity which serves as the immediate container wall for any suitable content which may be a relatively corrosive fluid or liquid or of a type that the user wishes to at least avoid its loss by breakage or seepage through walls of the container. The outer or enclosing wall of resin material serves as an ornamental shape and design-providing protective wall that is highly shock resistant and which is formed in place about the base or primary part or walls, employing the latter as an inner wall of a mold cavity. The temperature employed in forming the resin wall is well below one which will melt or weaken the base part. The forming is effected in such a manner that the resin wall is in a resilient pressed relation and an adherent relationship about the primary wall part.

I have foud that best results are obtained by using expandable resin pellets or beads of a suitable material, such as polystyrene, which may be pre-expanded, if desired. I place them in position in a mold cavity defined by the primary part and an outer mold and then heat-expand, shape and form the resin beads into a cohesive, and relatively resilient body, employing a suitable pressure agency, such as steam within the mold cavity. The forming is preferably effected in such a manner that the enclosing outer wall part substantially continuously bounds the side and end walls of the primary part and, at least, up to a neck portion thereof through the open mouth of which a suitable material, such as a fluid is introduced and removed.

After the enclosing resinous wall part has been formed, as a coherent whole into a desired shape, configuration, or with desired lettering in a resiliently pressed relation about the relatively rigid primary part and, as governed by the particular shape, lettering and design of the outer mold, the outer mold may be removed when the resin body has been cooled or is permitted to cool below about 130° F. This produces a somewhat smooth and glossy outer surface as to the secondary or enclosing wall part. Although I also contemplate continuing the resinous body up to and along the neck portion of the primary part if, in a particular field of use, it is advantageous, I have for the purpose of illustration shown the neck portion of the inner part as extending or projecting beyond the outer part where a relatively rigid type of connection with a sealing cap, as by utilizing threads or latching portions about the neck, is to be employed.

An expanded plastic shell, wall or coating provided in accordance with my invention overcomes many disadvantageous features of metal and glass containers, by surrounding them with a protective covering of pleasing exterior shape made to any desired configuration. In addition, to offering a pleasing exterior, such a wall covering protects a glass container from shock to therefore reduce impact breakage, such as would result when dropping it on a hard surface. Where a glass container is used for packaging a liquid with dissolved gas under pressure, such as an aerosol, an expanded resin or plastic wall covering prevents broken glass particles from flying dangerously about.

Referring now to the drawings, and particularly Figure 1, a pre-formed primary or base container shape 10 of rigid material, such as glass or metal, is shown provided with a neck portion 11, which may be exteriorly threaded to receive an internally-threaded closure member or cap. The container part 10 is shown positioned within a cavity as a part of a mold assembly 12. The mold assembly 12, as shown, includes a partible side wall mold provided with longitudinally-split side wall parts 13 which are hinged together, a bottom end wall mold part 14, and a top end wall mold or closure part 20. These parts may be of a suitable metal or alloy such as aluminum or stainless steel or of a resin, such as an epoxy. The parts 14 and 20 may be removably secured or clamped in position in any suitable manner. The end part 14 is shown provided with an opening 15 to conform with and receive the exterior of a neck portion 11 of the primary container part 10.

A set of steam injection ducts 17 are shown formed between adjacent complementary surfaces of the end part 14 and the side parts 13. Each duct 17 is shown in communication with a passageway or circular slit 18 which is also formed between the complementary surfaces. Each slit 18 communicates with the cavity of the mold, and with ducts 17 to inject steam into the mold cavity and expansion-heat and form expandable resin or plastic beads or pellets 28 into an outer or enclosing wall body for the base part 10.

The side mold parts 13 are provided with an inwardly-flanged end portion 19 that defines an opening 19' at the upper end of the mold through which the beads 28 may be blown or introduced into the mold cavity. The upper end part 20, like the part 14, has a closely interfitting relation with the parts 13 when they are closed to provide a substantially fluid-tight or sealed-off mold cavity. In Figure 1, a gasket 23 is shown clamped in position by bolt and wing nut assemblies 24. As shown, the inner peripheral face 21 of the part 20 interfits with a corresponding face 19' of the flange 19 and flange portion 22 of the part 20 abuts the gasket 23.

In operation, end mold parts 14 and 20 are removed, and the side mold parts 13 are opened, in order that a previously-formed container part 10 may be positioned in an inverted relation therein. The mold part 14 may be placed in position before or after the parts 13 are closed, but in any event, the neck portion 11 of the basic container 10 is moved or screwed into position within the portion 15. The mold part 14 is, of course, secured in a sealed relation with respect to the side parts 13 to close-off the bottom of the mold assembly. The side mold parts 13 may then be closed and clamped together.

The expandable plastic material, such as the beads 28, may then be poured or blown into the cavity of the mold and about the exterior of the basic container 10. The top mold part 20 may then be moved into a closing position as to the mold cavity and secured in such position by suitable means, such as the wing nut assemblies 24. Steam may then be injected to heat-expand and shape the pellets 28 into a complete, cohesive, enclosing wall part 26 about the base part 10.

The composite article or container thus produced has been found to have surface adherency between its parts 10 and 26 that is enhanced by the pressure-set bonding of the somewhat resilient resin body 26 about the more or less rigid body 10. It will be noted that the bulk density of the beads 28 may be about 5 pounds per cubic foot or within a range of about ½ to 20 pounds per cubic foot, as compared to about 60 pounds per cubic foot for a pressure-molded resin. The expanded wall 28 has a high degree of resiliency which absorbs shock; the resin beads produce a smooth-skinned, closed cell, foam wall of controlled density, registering every detail of the mold.

After the enclosing wall 26 has been formed, it is permitted to cool in the mold cavity, resulting in a somewhat glossy surface finish. The mold parts may then be removed and the operation repeated. Since the resin readily conforms to any desired shape and fills all portions of the mold cavity, I can produce an outer enclosing wall part having any desired shape or configuration, including lettering thereon.

With expandable beads in place within the mold, expansion times range from 10 to 90 seconds at from 10 to 40 p.s.i. steam pressures, with temperatures of about 230 to 275 degrees F. Cooling time ranges between 1 and 15 minutes, depending on the conformation of the shape and cooling provisions for the mold. If desired, the parting line of the split side mold parts 13 may be employed to permit the escape of steam condensate from the mold cavity.

Figure 2 illustrates a composite vessel or container 25 having an expanded outer shell wall 26 about a rigid liner or primary container part 10. As shown in the drawing, outer shell or wall 26 completely surrounds or encompasses main portions of the inner container part 10, and only the neck portion 11 is exposed for applying a closure member. The configuration of the exemplary outer shell 26, illustrated in Figure 2, is provided with a planar or flat bottom surface $a$, an enlarged convex lower side portion $b$, a central concave gripping or side handling portion $c$, and a smaller convex upper side portion $d$ that extends from the central portion $c$ into a somewhat planar top shoulder portion $e$. The shoulder portion $e$ declines downwardly from the neck 11 of the primary container part 10 to facilitate pouring or dispensing of material contained within the cavity of the vessel 25.

I have found that polystyrene beads or pellets are highly suitable. Foam from expandable polystyrene is dimensionally stable at ambient temperatures up to about 175 degrees F. It is resistant to acids, alkalies and lower alcohols, although susceptible to attack by polystyrene solvents, such as ketones, esters, and aromatic hydrocarbons. It produces a closed-cell structure with controllable density. In addition, it has lower thermal conductivity, lower water vapor permeability, toughness, excellent dielectric characteristics, and all around adaptability.

Although I have described a preferred embodiment of my invention, it is to be understood that various changes and modifications may be made thereto without departing from the spirit and scope thereof, as indicated by the appended claim.

What I claim is:

A method of ornamenting and protecting a substantially rigid container part which comprises, employing the container part as an inner wall of a mold cavity, filling the mold cavity about the container part with beads of expandable polystyrene, injecting steam within the mold cavity to heat-expand and mold the polystyrene beads in place about the container part and set-form an outer resilient shell about the rigid container part.

References Cited in the file of this patent

UNITED STATES PATENTS

| | | |
|---|---|---|
| 2,110,470 | Norton | Mar. 8, 1938 |
| 2,552,641 | Morrison | May 15, 1951 |
| 2,629,698 | Sterling | Feb. 24, 1953 |
| 2,653,139 | Sterling | Sept. 22, 1953 |
| 2,929,525 | Glover et al. | Mar. 22, 1960 |

FOREIGN PATENTS

| | | |
|---|---|---|
| 289,213 | Switzerland | June 16, 1953 |

Notice of Adverse Decision in Interference

In Interference No. 93,006 involving Patent No. 2,981,984, J. B. Orr, Plastic coatings for containers, final judgment adverse to the patentee was rendered Apr. 21, 1964, as to claim 1.

[*Official Gazette October 27, 1964.*]